US012771859B2

(12) United States Patent
Yuan et al.

(10) Patent No.: US 12,771,859 B2
(45) Date of Patent: Oct. 20, 2026

(54) VIDEO STREAM ENCODING BOTH OVERVIEW AND REGION-OF-INTEREST(S) OF A SCENE

(71) Applicant: Axis AB, Lund (SE)

(72) Inventors: Song Yuan, Lund (SE); Viktor Edpalm, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 18/918,422

(22) Filed: Oct. 17, 2024

(65) Prior Publication Data

US 2025/0133226 A1 Apr. 24, 2025

(30) Foreign Application Priority Data

Oct. 18, 2023 (EP) .................................... 23204444

(51) Int. Cl.

| | |
|---|---|
| ***H04N 19/33*** | (2014.01) |
| ***H04N 19/105*** | (2014.01) |
| ***H04N 19/167*** | (2014.01) |
| ***H04N 19/172*** | (2014.01) |

(52) U.S. Cl.

CPC ........... *H04N 19/33* (2014.11); *H04N 19/105* (2014.11); *H04N 19/167* (2014.11); *H04N 19/172* (2014.11)

(58) Field of Classification Search

CPC .... H04N 19/33; H04N 19/105; H04N 19/167; H04N 19/172

See application file for complete search history.

(56) References Cited

U.S. PATENT DOCUMENTS 6,377,628 B1 * 4/2002 Schultz ................ H04N 19/436 382/233
6,496,537 B1 * 12/2002 Kranawetter .......... H04N 19/61 375/240.24
6,510,177 B1 * 1/2003 De Bonet ............. H04N 19/51 375/E7.125
6,594,315 B1 * 7/2003 Schultz .................. H04N 19/90 382/233

(Continued)

FOREIGN PATENT DOCUMENTS

EP 0883300 A2 12/1998
EP 4443874 A1 9/2024

OTHER PUBLICATIONS

Seregin, V., et al., “SHVC HLS: On adaptive resolution change based on single_layer_for_non_irap_flag”, JCT-VC Meeting, Geneva, (2013).

(Continued)

*Primary Examiner* — Zaihan Jiang

(74) *Attorney, Agent, or Firm* — Volpe Koenig

(57) ABSTRACT

A method for encoding a video stream includes obtaining images of a scene captured by a camera at a first resolution; identifying regions of interest (ROIs) in an image; adding, as part of an encoded video stream, a first video frame encoding at least part of the image at a second resolution lower than the first resolution; adding a second video frame marked as a no-display frame, and being an inter-frame referencing the first video frame with motion vectors for upscaling of the ROIs; adding a third video frame encoding the ROIs at a third resolution higher than the second resolution, and being an inter-frame referencing the second video frame.

12 Claims, 6 Drawing Sheets

(56) References Cited

U.S. PATENT DOCUMENTS

| | | | | |
|---|---|---|---|---|
| 6,728,317 | B1 * | 4/2004 | Demos | H04N 19/17<br>348/E7.015 |
| 6,879,631 | B1 * | 4/2005 | Schultz | H04N 19/428<br>375/240.11 |
| 6,970,504 | B1 * | 11/2005 | Kranawetter | H04N 19/436<br>375/240 |
| 10,616,592 | B2 | 4/2020 | Edpalm et al. | |
| 2015/0373341 | A1 | 12/2015 | Davies | |
| 2016/0182911 | A1 | 6/2016 | Su et al. | |
| 2016/0366365 | A1 * | 12/2016 | Iyer | G06F 3/013 |
| 2018/0213202 | A1 | 7/2018 | Kopeinigg et al. | |
| 2018/0295400 | A1 | 10/2018 | Thomas et al. | |
| 2018/0315196 | A1 * | 11/2018 | Socek | G06V 10/56 |
| 2018/0315199 | A1 * | 11/2018 | Socek | G06T 7/207 |
| 2018/0324455 | A1 | 11/2018 | Nakagami et al. | |
| 2019/0116371 | A1 * | 4/2019 | Edpalm | H04N 19/167 |
| 2019/0116382 | A1 | 4/2019 | Edpalm et al. | |
| 2022/0210461 | A1 * | 6/2022 | Piao | H04N 19/44 |
| 2025/0191126 | A1 * | 6/2025 | Bleyer | G06T 3/40 |

OTHER PUBLICATIONS

Ugur, K., et al., “Adaptive resolution change with SHVC”, JCT-VC Meeting, Geneva, (2013).

Chang, T., et al., “Adaptive resolution change for Versatile Video Coding”, IEEE International Conference on Visual Communications and Image Processing, (2020).

Extended European Search Report dated Mar. 28, 2024 for European Patent Application No. 23204444.6.

* cited by examiner

VIDEO STREAM ENCODING BOTH OVERVIEW AND REGION-OF-INTEREST(S) OF A SCENE

TECHNICAL FIELD

The present disclosure relates to the field of encoding of video streams. In particular, the present disclosure relates to methods and devices for encoding both lower- and higher-resolution images of a scene within a same video stream.

BACKGROUND

When monitoring a scene using a video camera, certain regions of the scene may, for various reasons, be considered as being more interesting than others. Such regions of interest (ROIs) may for example include faces of humans, facial features such as e.g. one or more eyes, license plates of vehicles, and similar, and may be either fixed or dynamically defined using e.g. object detection and/or tracking.

To consume less bandwidth, contemporary cameras may be capable of outputting such ROIs at higher-resolution, while other, non- or less interesting regions are output at lower-resolution. For example, during surveillance, ROIs may be output (and e.g. stored) at sufficiently high resolution to be used as evidence if needed. As another example, license plates may be detected by a video camera (i.e. "on the edge"), and images of the detected license plates at sufficiently high resolution may be output by the camera and provided to a server responsible for e.g. license plate number recognition or similar.

In contemporary solutions, a video camera may be configured to capture images of the scene at a higher-resolution, such as e.g. HD, full HD, 4K, 8K, and similar, and to output a lower-resolution overview of the scene by first downsampling the captured images before encoding them in an output video stream. To also provide the higher-resolution ROIs, the camera may be further configured to produce higher-resolution JPEG crops of the ROIs, and to e.g. send these crops in parallel with the lower-resolution overview of the scene. Issues pertinent to such a procedure may include e.g. higher bitrate consumption and lack of synchronization between the lower-resolution overview and the higher-resolution ROIs.

The present disclosure aims at improving upon such contemporary technology.

SUMMARY

To at least partially resolve some of the above-identified issues with contemporary technology, the present disclosure provides an improved method, device, computer program and computer program product of/for encoding a video stream as defined in and by the accompanying independent claims. Various embodiments of the method, device, computer program and computer program product are defined in and by the accompanying dependent claims.

According to a first aspect of the present disclosure, there is provided a method for encoding a video stream. The method includes obtaining one or more subsequent images of a scene captured by at least one camera, wherein each of the one or more images has a respective first resolution. The method further includes, for each of the one or more images, identifying one or more regions of interest (ROIs) in the image, and adding a set of video frames to an encoded video stream. The set of video frames (for each of the one or more images) includes at least: i) a first video frame encoding at least part of the image at a respective second resolution lower than the first resolution; ii) a second video frame marked as a no-display frame, and being an inter-frame referencing the first video frame of the set and including motion vectors for upscaling of the one or more ROIs; and iii) a third video frame encoding the one or more ROIs of the image at a respective third resolution higher than the respective second resolution, the third video frame being an inter-frame referencing the second video frame of the set of video frames.

As used herein, a "no-display frame" is to be understood as a frame which is in any way flagged to instruct a decoder that the frame is not to be rendered as part of a decoded video stream, but that the frame is still available such that information may be obtained from it and used for the decoding of one or more other image frames which are to be displayed (i.e. not marked as no-display frames). As used herein, "motion vectors" are to be understood as information provided as part of one encoded frame and serving as instructions for where data useful for rendering one or more particular regions of the frame can be found in one or more other frames. For example, a motion vector may be considered as a two-dimensional vector used for inter-prediction that provides an offset from the coordinates in the decoded image to the coordinates in a reference image. For example, a motion vector may be used to represent a macroblock in the decoded image based on the position of this macroblock (or a similar one) in the reference image. It is envisaged that any video coding standard which supports the above concepts of no-display frames, motion vectors, and the possibility of one frame referencing one or more other (previous and/or later) frames, may be used to realize the disclosed method. Examples of such standards include (but are not necessarily limited to) High Efficiency Video Coding (HEVC) H.265, Advanced Video Coding (AVC) H.264, VP8, VP9, AV1, and Versatile Video Coding (VVC) H.266. For example, in H.265, a "no-display frame" may be created by setting pic_output_flag syntax element in the slice header to false, or e.g. by setting the no_display flag in the SEI header equal to true.

As will be described in more detail later herein, the envisaged method of encoding a video stream improves upon currently available technology in that it allows to provide both a lower-resolution overview of a scene and higher-resolution crops of one or more ROIs within a same encoded video stream, and with less bit rate consumption and without synchronization issues.

In one or more embodiments of the method, the method may include generating the encoded video stream using a layered type of coding such as scalable video coding (SVC). For at least one set of video frames, the first and second video frames may be inserted in a base layer of the encoded video stream, and the third video frame may be inserted in an enhancement layer of the encoded video stream. Using an enhancement layer may e.g. help to provide the third video frame at a resolution higher than that used to encode the first and/or second video frames, and without limitations to the total area of ROIs.

In one or more embodiments of the method, the respective third resolution may equal the respective first resolution, i.e. the resolution of the ROIs may match that used by the camera to capture the scene.

In one or more embodiments of the method, for at least one set, the operation ii) of adding the second video frame may further include rearranging the upscaled one or more ROIs to cover more pixels of the second video frame. Phrased differently, the position of a ROI in the second video frame may not necessarily match the position of the ROI in the corresponding first video frame. By rearranging the upscaled one or more ROIs, the available pixels of the second video frame may be better utilized, and e.g. allow to upscale the one or more ROIs without the one or more ROIs starting to overlap.

In one or more embodiments of the method, for at least one set of video frames, the operation iii) of adding the third video frame may further include inserting one or more skip-blocks for parts of the third video frame not encoding the one or more ROIs.

In one or more embodiments of the method, for at least one set of video frames, the first video frame may be an inter-frame referencing the first video frame of a previous set of video frames.

In one or more embodiments of the method, for at least one set of video frames, the third video frame may further reference the third video frame of a previous set of video frames.

In one or more embodiments of the method, the method may be performed by a same camera used to capture the one or more images of the scene. Phrased differently, the method may be performed on the edge, and e.g. without requiring additional, intermediate video processing equipment.

In one or more embodiments of the method, the first and/or third video frame may also be marked as a no-display frame. In general, if e.g. the video stream is not layered, it may be desirable to show (after decoding) only the first video frames providing the lower-resolution overview of the scene or the third video frames providing the higher-resolution ROIs of the scene, etc. It is also envisaged that e.g. the first and/or third video frame(s) may be marked using other types of metadata, such that a particular flag indicating whether the video frame corresponds to an overview or ROIs, and similar. A suitable decoder may then select whether to display only the overview, only the ROI, or e.g. both the overview and ROI (preferably on different parts of a screen or on different screens). Other examples include to e.g. configure the decoder such that it knows in what sequence the video frames are arranged, such that it may selectively e.g. render only the overview, only the ROIs, or e.g. both the overview and ROIs. For example, the decoder may be informed that the video frames arrive ordered as "1-2-3-1-2-3-1-2-3-1-2-3 . . . " (where "1" indicates a first video frame, "2" a second video frame, and "3" a third video frame), or similar. If the video stream is layered, whether to only show the overview or the ROIs, or both, may be controlled accordingly by marking the first and third video frames as no-display frames or not. In general, the envisaged method still enables to provide the information required to decode and render both a lower-resolution overview of the scene as well as higher-resolution ROIs, in a same encoded video stream.

According to a second aspect of the present disclosure, there is provided a device for encoding a video stream. The device includes a processor (e.g. processing circuitry) and a memory storing instructions that, when executed by the processor, cause the device to: a) obtain (e.g. by receiving from another device, reading from an external or internal memory, reading and interpreting a received signal, receiving from one or more camera image sensors, and similar) one or more subsequent images of a scene captured by at least one camera, each of the one or more images having a respective first resolution, and, b) for each of the one or more images: —identify one or more regions of interest (ROIs) in the image (i.e., one or more ROIs of the scene); —add a set of video frames to an encoded video stream, the set comprising at least: i) a first video frame encoding at least part of the image at a respective second resolution lower than the first resolution; ii) a second video frame marked as a no-display frame, and being an inter-frame referencing the first video frame of the set of video frames and including motion vectors for upscaling of the one or more ROIs, and iii) a third video frame encoding the one or more ROIs of the image at a respective third resolution higher than the respective second resolution, the third video frame being an inter-frame referencing the second video frame of the set of video frames. The device of the second aspect may therefore be configured to perform the method of the first aspect as disclosed herein.

In one or more embodiments of the device, the instructions stored in the memory of the device may be further such that they, when executed by the processor, cause the device to perform any embodiment of the method (of the first aspect) as disclosed herein.

In one or more embodiments of the device, the device may be a camera (configured) for capturing the one or more images of the scene. The envisaged method may therefore be performed on the edge, within the camera itself, without intermediate video processing equipment. In other embodiments, the device may e.g. be a server which receives the one or more images of the scene from e.g. the video camera capturing the scene, or e.g. from a storage wherein such images has earlier been received from the camera, and similar.

According to a third aspect of the present disclosure, there is provided a computer program for encoding a video stream. The computer program is configured to, when executed by a processor of a device (such as the device of the second aspect), cause the device to: a) obtain (e.g. by receiving from another device, reading from an external or internal memory, reading and interpreting a received signal, receiving from one or more camera image sensors, and similar) one or more subsequent images of a scene captured by at least one camera, each of the one or more images having a respective first resolution, and, b) for each of the one or more images: —identify one or more regions of interest (ROIs) in the image (i.e., one or more ROIs of the scene); —add a set of video frames to an encoded video stream, the set comprising at least: i) a first video frame encoding at least part of the image at a respective second resolution lower than the first resolution; ii) a second video frame marked as a no-display frame, and being an inter-frame referencing the first video frame of the set of video frames and including motion vectors for upscaling of the one or more ROIs, and iii) a third video frame encoding the one or more ROIs of the image at a respective third resolution higher than the respective second resolution, the third video frame being an inter-frame referencing the second video frame of the set of video frames. The computer program of the third aspect may therefore be configured to cause a device as envisaged herein (or any other suitable device) perform the method of the first aspect as disclosed herein.

In one or more embodiments of the computer program, the computer program is further configured to, when executed by the processor of the device, cause the device to perform any embodiment of the method of the first aspect as disclosed herein.

According to a fourth aspect of the present disclosure, there is provided a computer program product, including a computer-readable storage medium storing a computer program (e.g. computer program code) according to the third aspect (or any embodiment thereof disclosed herein). As used herein, the computer-readable storage medium may e.g. be non-transitory, and be provided as e.g. a hard disk drive (HDD), solid state drive (SDD), USB flash drive, SD card, CD/DVD, and/or as any other storage medium capable of non-transitory storage of data. In other embodiments, the computer-readable storage medium may be transitory and e.g. correspond to a signal (electrical, optical, mechanical, or similar) present on e.g. a communication link, wire, or similar means of signal transferring, in which case the computer-readable storage medium is of course more of a data carrier than a data storing entity.

Other objects and advantages of the present disclosure will be apparent from the following detailed description, the drawings and the claims. Within the scope of the present disclosure, it is envisaged that all features and advantages described with reference to e.g. the method of the first aspect are relevant for, apply to, and may be used in combination with also the device of the second aspect, the computer program of the third aspect, and the computer program product of the fourth aspect, and vice versa.

BRIEF DESCRIPTION OF THE DRAWINGS

Exemplifying embodiments will now be described below with reference to the accompanying drawings, in which.

Figure 1A:
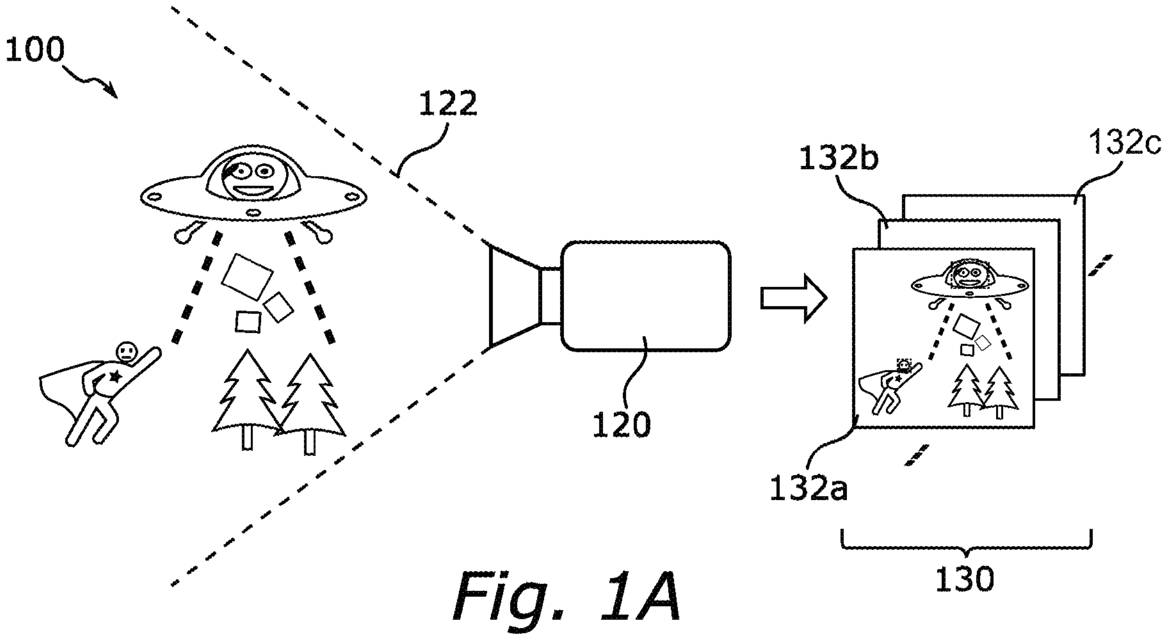
FIG. 1A schematically illustrates an example setup of a (video) camera capturing a scene as envisaged herein.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments.

DETAILED DESCRIPTION

FIG. 1A schematically illustrates an example of how a scene 100 is captured by a camera 120. The camera 120, which may be a video camera, has a field-of-view (FOV) 122 and is configured to capture (and record/store) images. The FOV 122 is e.g. defined by a location of the camera 120, an orientation of the camera 120 (e.g. as a set of pitch, roll and yaw angles, or similar), as well as a zoom-level of the camera 120. The camera 120 may for example be a so-called pan-tilt-zoom (PTZ), capable to both pan, tilt and zoom, or similar. The FOV 122 of the camera 120 is, as illustrated in FIG. 1A, configured such that the camera 120 captures at least part of the scene 100, resulting in the camera outputting one or more sequential images 130 of the scene 100. For example, the one or more sequential images 130 may include a first image 132*a*, a second image 132*b*, a third image 132*c*, etc., captured at different time instances.

Figure 1B:
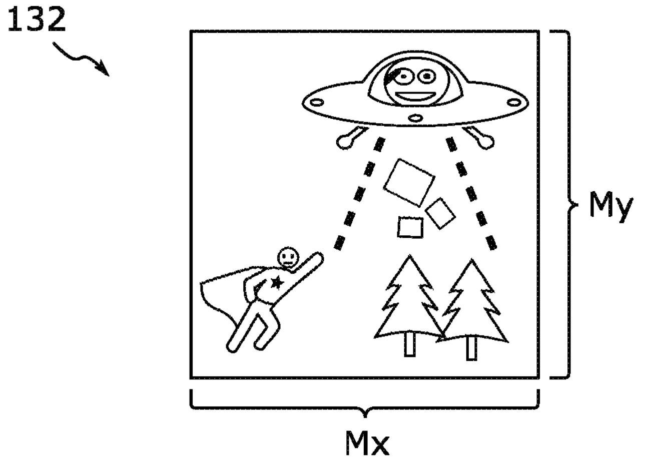
FIG. 1B schematically illustrates an example image of a scene captured by the camera at a first resolution, as envisaged herein.

FIG. 1B schematically illustrates an example image 132 of the scene 100, as captured by the camera 120. The image 132 is captured at a first resolution, defined by the number of pixels used to represent the part of the scene 100 captured by the camera 120. The image 132 is $M_x$ pixels wide and $M_y$ pixels high, where $M_y$ and $M_y$ are integers. A total number of pixels used to represent the captured part of the scene 100 in the image 132 is therefore $M_x \times M_y$. As used herein, a resolution of the image 132 may be defined as a density of pixels, e.g. as a total number of pixels used to define a certain area of the image 132 (such as e.g. a total number of pixels per square centimeter, or per square inch, or similar). Pixel density may also be defined e.g. per image axis, for example as a number of pixels per centimeter or e.g. inch, and may be different in the horizontal (width) direction and the vertical (height) direction of the image 132. Generally herein, when referring to one image as having a different resolution than another image, it is meant that the images uses a different total number of pixels to represent a same feature in the image, assuming that both images shows a same instance of a same scene. For example, an image considered to have a higher resolution is assumed to use more pixels to represent a feature than an image considered to have a lower resolution, and vice versa. For two images showing a same instance of a same scene, the image having the largest number of pixels (either in a particular direction or overall) is considered to have the largest resolution (in that particular direction or overall).

Figure 1C:
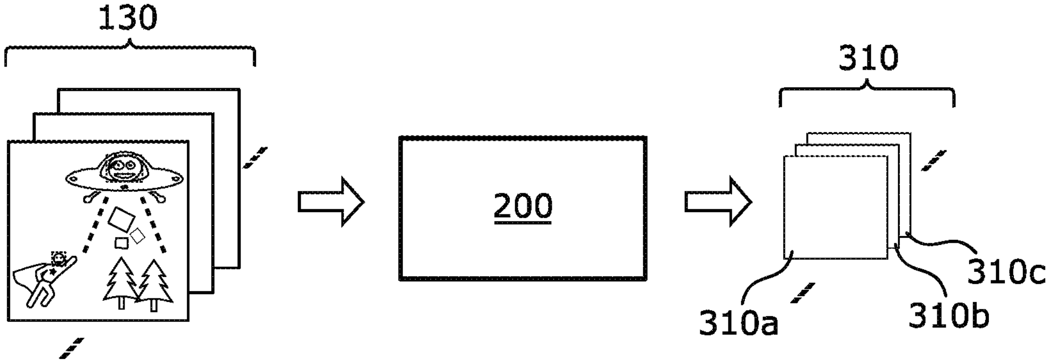
FIG. 1C schematically illustrates an example procedure for encoding one or more images of the scene as part of an encoded video stream.

FIG. 1C schematically illustrates a process of encoding images of a scene (as captured by the camera 120) into an encoded video stream. Here, the set of one or more (subsequent) images 130 is provided as input to an encoder 200, which is configured to encode the one or more images 130 as one or more video frames of an encoded video stream. For example, the first image 132*a* may be encoded as part of a first video frame 310*a*, the second image 132*b* may be encoded as part of a second video frame 310*b*, the third image 132*c* may be encoded as part of a third video frame 310*c*, and so on. Notably, the encoder 200 does not just save the images 130 "as is" in the video frames of the encoded video stream 310, but relies on various algorithms in order to use e.g. temporal redundancies between images, spatial redundancies within a single image or between images, etc., in order to compress the visual information provided in the images 130 such that the encoded video stream 310 consumes less memory and requires less bandwidth than if just sending the images 130 as is. For this purpose, the encoder 200 may e.g. use one or more of contemporary video coding standards, including but not limited to High Efficiency Video Coding (HEVC) H.265, Advanced Video Coding (AVC) H.264, VP8, VP9, AV1, and Versatile Video Coding (VVC) H.266.

If the camera 120 is for example a surveillance camera, a speed control camera, or similar, it may be assumed that not all parts of the scene 100 are of equal interest to a person (or computer) viewing the scene 100 as captured by the camera 120, e.g. by decoding the encoded video stream 310 output by the encoder 200. To the contrary, there may be one or more regions of the scene 100 that are of particular interest, i.e. so-called regions of interest (ROIs). For example, if the camera 120 is a speed control camera, the most interesting parts of the scene 100 may include vehicles, and in particular the license plates of the vehicles such that each vehicle (and e.g. its owner) may be identified. If the camera 120 is a surveillance camera, the more interesting parts of the scene 100 may include faces of persons in the scene 100, in order to e.g. identify the persons based on known facial characteristics (facial recognition), and similar. Other regions of the scene 100, such as e.g. sky, lawns, walls, empty streets, etc., may be of less interest.

As certain regions (or parts) of the scene 100 may be more interesting than others, it may be beneficial if the depictions of these ROIs can be provided at higher resolution. For example, a facial recognition software, or a software configured to identify license plate numbers from images of license plates, may perform better on higher-resolution images than on lower-resolution images. One solution may include to capture the full images 130 at higher resolution and to avoid compressing (and/or reducing the resolution of) these images as part of the encoding process performed by the encoder 200. However, such overall resolution increase may quickly render the bandwidth required to satisfyingly transfer the encoded video stream 310 over e.g. the Internet too high, and may result in the video stream 310 not being transferred at all or at a rate which results in stuttering and/or lag for the receiver when attempting to decode and view the video stream 310. Another, more plausible, solution is instead of course to only transfer image data belonging to the ROIs at a higher resolution, while reducing the resolution for image data belonging to other parts of the scene 100 than the ROIs. Contemporary such solutions include to generate and encode a lower-resolution overview of the scene 100, and to transfer, in parallel therewith, higher-resolution crops (compressed using e.g. the Joint Photographic Experts Group, JPEG, standard or similar). However, the bandwidth required to transfer such higher-resolution JPEG crops may still be higher than desired, and issues may arise related to how to e.g. synchronize such higher-resolution crops with the images of the lower-resolution overview.

As will now be described in more detail, the present disclosure aims at improving on such contemporary solutions by providing an improved way of encoding a video stream, suitable to handle the situation wherein it is desirable to provide both a lower-resolution overview of the scene as well as higher-resolution crops/excerpts of one or more ROIs of the scene. The envisaged method will be described below with reference first also to FIGS. 2A to 2D, 3, 4 and 5.

Figure 5:
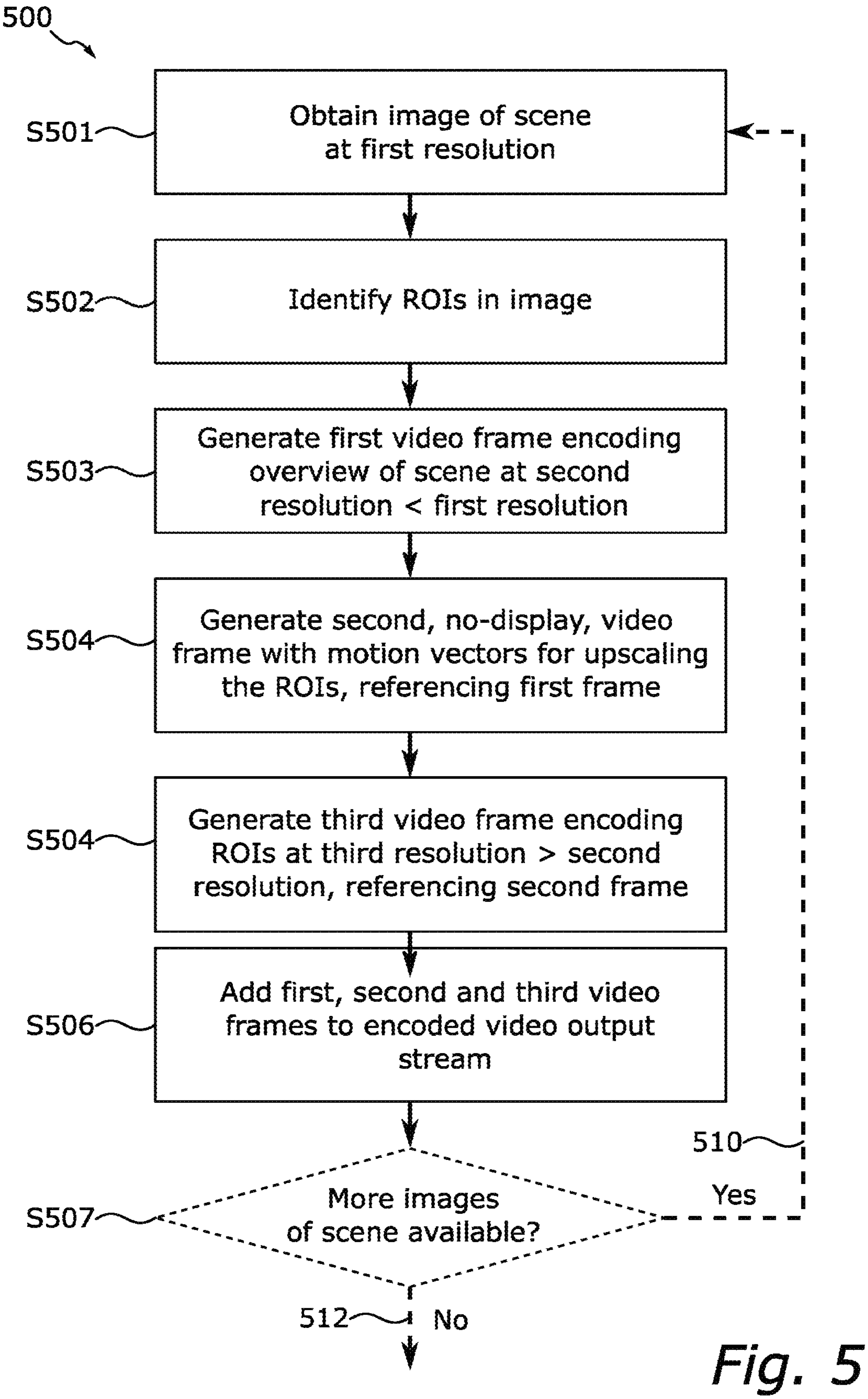
FIG. 5 schematically illustrates a flowchart of an example embodiment of a method of encoding a video stream according to the present disclosure.

FIG. 5 schematically illustrates a flowchart of an embodiment of a method 500 for encoding a video stream according to the present disclosure, while FIGS. 2A to 2D schematically illustrates, more graphically, various operations of the envisaged method 500 in more detail. In what follows, it is envisaged that such a method 500 may be implemented as part of the encoder 200, wherein it is of course envisaged that the encoder 200 is then no longer the contemporary encoder referred to earlier herein, but modified or provided in accordance with the present disclosure. The same applies if the encoder 200 is e.g. part of the camera 120, in which the camera 120 as referred to below is no longer a contemporary camera but a camera modified or provided in accordance with the present disclosure.

Figure 2A:
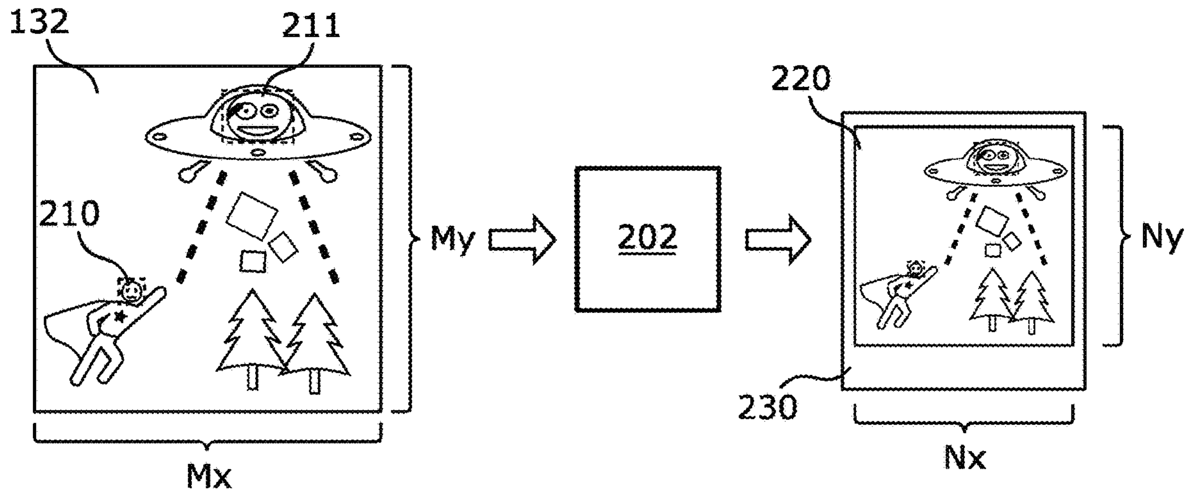
FIGS. 2A to 2D schematically illustrates various operations performed as part of encoding a video stream according to embodiments of the present disclosure.

The method 500 includes, as part of an operation S501, obtaining at least one image of the scene 100 at a first resolution. FIG. 2A schematically illustrates an example of such an image 132, provided at a resolution corresponding to $M_x$ horizontal/width pixels and $M_y$ vertical/height pixels. Although not illustrated in FIG. 2A, the method 500 further includes, as part of an operation S502, identifying one or more ROIs in the image 132. In this particular example, this includes identifying two ROIs 210 and 211. For example, as illustrated, the scene 100 may hypothetically include a superhero attempting to engage a visiting extraterrestrial lifeform engaged in suspicious activity. The first ROI 210 may include the face of the superhero, and the second ROI 212 may include the face of the extraterrestrial lifeform.

An operation S503 of the method 500 includes generating a first video frame 230 encoding at least part of the image 132 at a second resolution that is lower than the first resolution. This may e.g. be performed by providing the image 132 to a downscaling module 202 that may be provided/implemented as part of e.g. the encoder 200 or any other suitable device in accordance with the present disclosure. The first video frame 230 encodes a downscaled image 220 of the scene 100, with $N_x$ horizontal/width pixels and $N_y$ vertical/height pixels. The second resolution, defined by $N_x$ and $N_y$ is lower than the first resolution, e.g. $N_x<M_x$, $N_y<N_y$, or at least $N_x \times N_y < M_x \times M_y$. The first video frame 230 may be an intra-frame not referencing any previous (or later) video frame, or the first video frame 230 may be an inter-frame referencing one or more previous video frames and/or one or more later video frames in the encoded video stream.

Figure 2B:
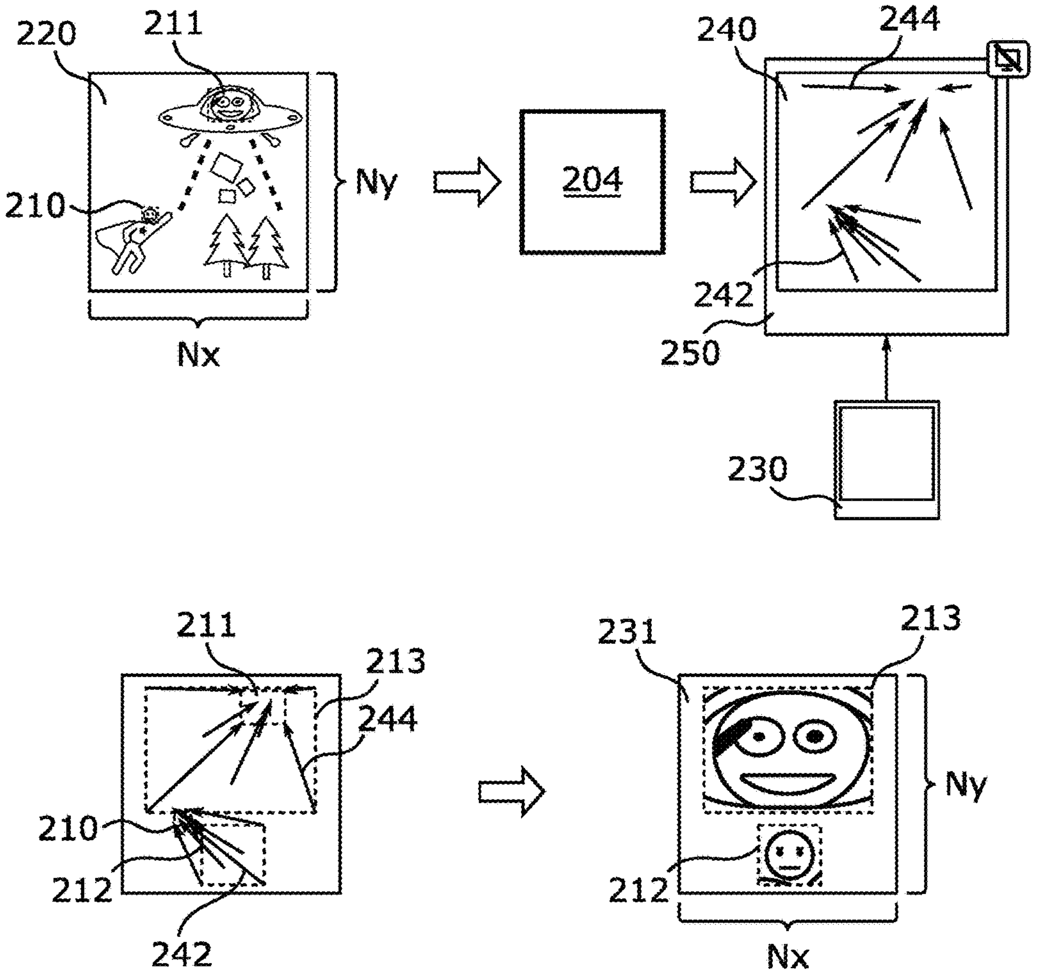

An operation S504 of the method 500 includes generating a second video frame. FIG. 2B schematically illustrates one example of such a second video frame 250. The second video frame 250 is an inter-frame which references the first video frame 230, and includes motion vectors 240 for upscaling of the one ROIs 210 and 211. For example, the second video frame 250 includes first motion vectors 242 for upscaling of the first ROI 210, and second motion vectors 244 for upscaling of the second ROI 211. In particular, the second video frame 250 is marked as a no-display frame (as indicated by the crossed-out monitor icon), i.e. the second video frame 250 may be decided by a corresponding decoder but preferably not visually rendered as part of a decoded video stream output by such a decoder. As already described herein, making the second video frame a no-display frame may e.g. be achieved by setting a corresponding flag of the video frame to a value indicative of such a feature, all depending on the particular video coding standard adhered to by the decoder 200. Generating the motion vectors 230 may e.g. be performed by an upscaling module 204 that may be provided/implemented as part of e.g. the encoder 200 or any other suitable device in accordance with the present disclosure.

The bottom portion of FIG. 2B illustrates the concept of the envisaged motion vectors 230 and how they may be created. On the bottom-left of FIG. 2B is shown a hypothetical overlay of the ROIs 210 and 211 as located in the downscaled image 220, as well as scaled-up crops 212 and 213 of the ROIs 210 and 211, respectively. To better utilize the number of available pixels and to obtain more scaled-up versions of the ROIs 210 and 211, the crops 212 and 213 have been both up-scaled and rearranged, such that the crops 212 and 213 does not overlap once decoded.

Instead of encoding the actual crops 212 and 213 directly in the second video frame 250, the method 500 as envisaged herein uses the motion vectors 230 for generating the up-scaled crops 212 and 213 from the lower-resolution overview of the scene 100 encoded in the first video frame 230. This may be achieved by e.g. deciding the target size and position of the crops 212 and 213 when the second video frame 250 is decoded, and to then, for each macroblock or similar of the second video frame 250, deciding where in the first video frame 230 and the lower-resolution image 220 encoded therein the corresponding features are to be found. This is schematically illustrated by the arrows corresponding to the first motion vectors 242 (for the first ROI 210) and the second motion vectors 244 (for the second ROI 211). Here, it may be seen that e.g. a macroblock belonging to the lower-right corner of the crop 212 (if assuming that the first ROI 210 is a rectangle) is defined by a motion vector 242 pointing towards the corresponding lower-right corner of the first ROI 210 in the first video frame 230. Similarly, a macroblock belonging to the lower-left corner of the crop 212 is defined by a motion vector pointing towards the corresponding lower-left (macroblock) corner of the first ROI 210 in the first video frame 230, and similar, and the same applies also to the motion vector(s) 244 for the second crop 213, pointing towards corresponding features/macroblocks of the second ROI 211 of the first video frame 230, etc. In FIG. 2B, the motion vectors 242 and 244 thus point from a to-be-decoded region of the image 240 towards a region in the image 220 in which data useful to decode the image 240 is found. The flow of information/data is thus in the opposite direction to that indicated by the arrows 242 and 244.

In particular, the motion vectors 240 are such that when the second video frame 250, which is an inter-frame referencing the first video frame 230, is decoded, the resulting image encoded by the second video frame 250 will include up-scaled (and potentially also rearranged) crops 212 and 213 of the ROIs 210 and 211 of the first video frame 210. The resolution of the image encoded by the second video frame 250 may be the same as the resolution of the image encoded by the first video frame 230, e.g. $N_x \times N_y$ pixels. An example of a resulting decoded image obtained after decoding the second video frame 250 is shown on the bottom-right of FIG. 2B, although the second video frame 250 is not, due to being marked as a no-display frame, preferably to be visually rendered by the decoder. Macroblocks of the second video frame 250 that are not relevant to the ROIs 212 and 213 may e.g. be encoded as being empty, as skip-blocks, or similar.

A second video frame 250 as envisaged herein may be considered as a "synthetic" or "auxiliary" video frame, and may be generated using e.g. software and manually inserted into the encoded video stream. Further details about how to generate such synthetic frames as well as about the use of motion vectors to transform (e.g. scale, translate, rearrange) features of images may be found in Applicants own previously published applications US20190116371A1 and US20190116382A1.

Figure 2C:
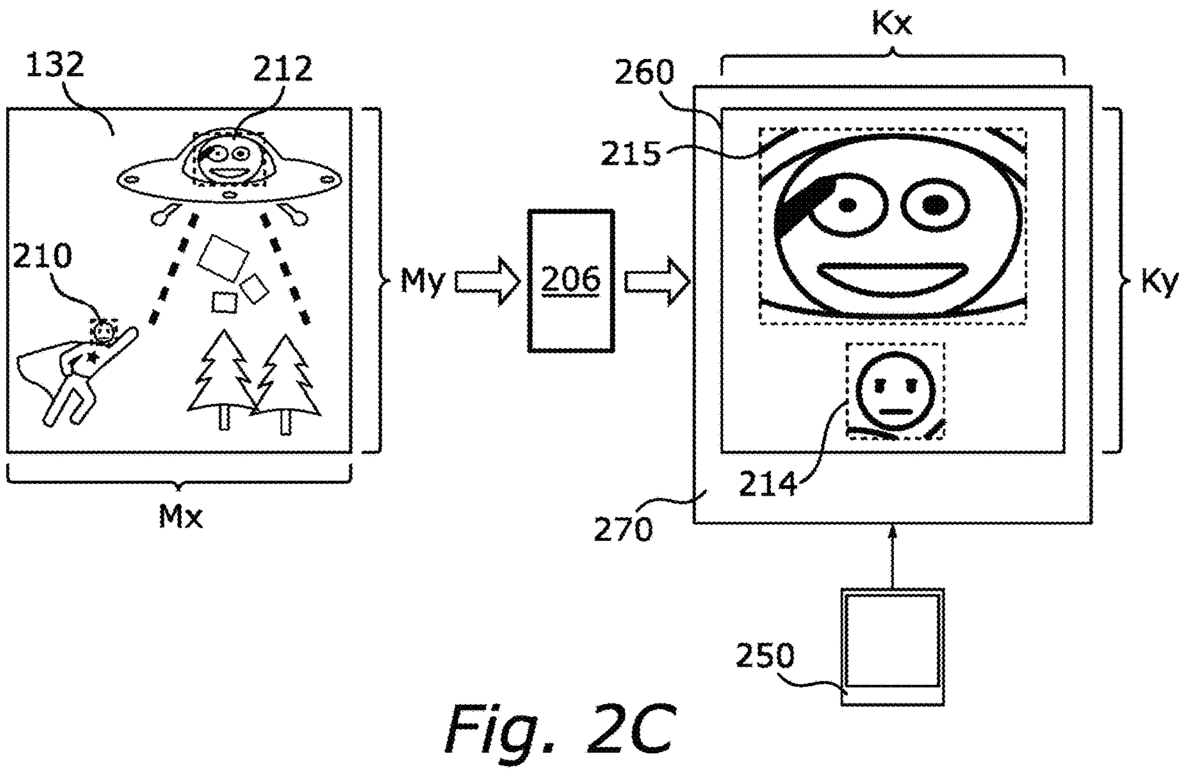

In an operation S504, the method 500 includes generating a third video frame encoding the ROIs 210 and 211 at a third resolution that is higher than the second resolution. FIG. 2C schematically illustrates an example of such a third video frame 270. This operation S504 may e.g. be performed/implemented by a ROI encoding module 206, which may be implemented as part of the encoder 200 or by any other suitable device in accordance with the present disclosure. Here, the third video frame 270 encodes an image 260 that does not include the full scene 100, but instead higher-resolution crops 214 and 215 of the ROIs 210 and 211.

Herein, that the third video frame 270 encodes the ROIs 210 and 211 at a higher (third) resolution than the second resolution means that, in at least one dimension, more pixels are used to represent the ROIs 210 and 211 in the third video frame 270 than in the downscaled overview image 220 of the scene 100 provided/encoded in the first video frame 230. For example, the resolution of the crops 214 and 215 may be equal to the resolution of the image 132 as captured by the camera 120. Depending on whether e.g. a layered type of coding is used or not, the overall resolution (i.e., full width/height) of the image 260 encoded in the third video frame 270 may be the same or e.g. higher than that of the image 220 encoded by the first video frame 230. The overall resolution of the image 260 may e.g. correspond to $K_x$ horizontal/width pixels and $K_x$ vertical/height pixels. If using a layered coding, the third video frame 270 may e.g. be include as part of an enhancement layer, and such that $K_x > M_y$, $K_x > M_y$, or at least $K_x \times K_y > M_x \times M_y$. If using e.g. a non-layered coding, it may be such that $K_x = M_x$, $K_y = M_y$, or at least $K_y \times K_x = M_x \times M_y$. In any case, the resolution of the actual ROI crops 214 and 215 will be higher than that of the ROIs 210 and 211 in the downscaled overview image 220, either due to a proportion of the area of the crops 214 and 215 to the total area of the image 260 being higher than a proportion of the ROIs 210 and 211 to the total area of the image 220, or by $K_x > M_x$ (and/or $K_y > M_y$), or both.

The image 260 may be decoded based on information found in e.g. the image 132 as captured by the camera 120. However, instead of directly encoding the image 260 in the third video frame 270, the third video frame 270 is an inter-frame which references the second video frame 250, such that any redundant information between the image 260 and the image 231 encoded using the motion vectors 240 of the second video frame 250 may be utilized to more efficiently encode the third video frame 270 in terms of e.g. bandwidth and memory requirements. The arrangement and/or scaling of the crops 214 and 215 may e.g. be such that it matches the arrangement and/or scaling of the crops 212 and 213 of the second video frame 250, or the arrangement and/or scaling of the crops 214 and 215 may be different from the arrangement and/or scaling of the crops 212 and 213 of the second video frame 250. If required, the third video frame 270 may include motion vectors allowing to identify where information for each macroblock required to decode the crops 214 and 215 is to be found in the (decoded) second video frame 250. In the third video frame 270, macroblocks not relevant for the crops 214 and 215 may e.g. be provided as empty blocks, as skip-blocks, or similar.

Figure 2D:
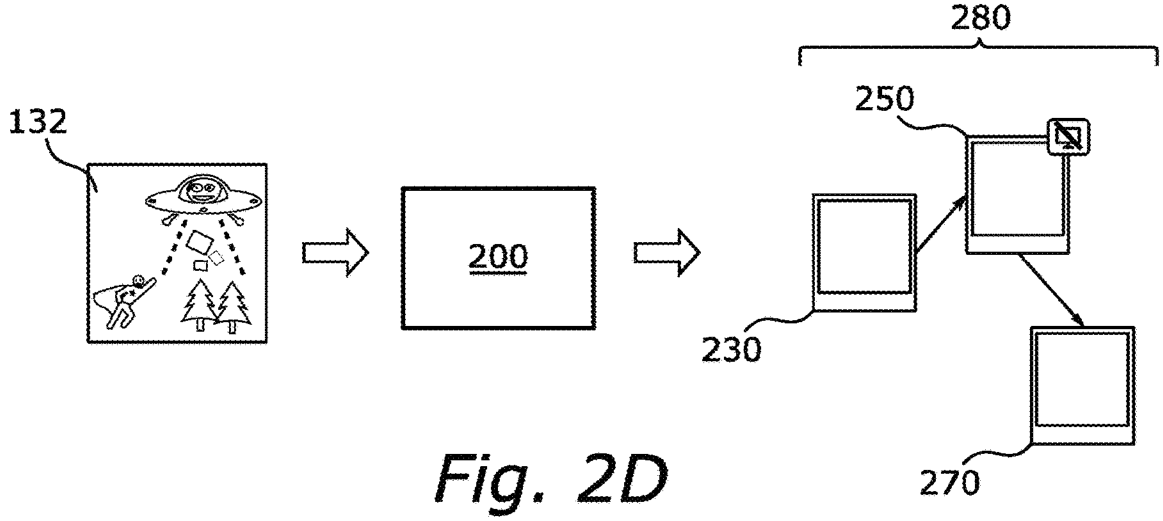

In an operation S506 of the method 500, the first, second and third video frames 230, 250 and 270 are used to form a set of video frames added to the encoded video stream output from the encoder 200. The frames 230, 250 and 270 may e.g. be added in the order they are generated or in any other suitable order, and may e.g. be added together or individually. Generally herein, the exact order of the various video frames is not necessarily important, as long as sufficient information is somehow provided for the decoder to figure out in which order to display the decoded images in order to e.g. play the decoded video stream in a way which is representative of the sequence of images of the scene captured by the camera 120. FIG. 2D schematically illustrates one example of a procedure of generating such a set 280 of video frames. The image 132 of the scene 100 (as captured by the camera 120) is provided to e.g. the encoder 200, and the encoder 200 (by performing the envisaged method 500) outputs the set of video frames 280 including the first video frame 230, the second (no-display) video frame 250, and the third video frame 270. Importantly, the first video frame 230 encodes a downscaled, lower-resolution version/overview of the scene 100. The second video frame 250 is an inter-frame referring to the first video frame 230 and includes motion vectors for generating (when decoded) upscaled versions of one or more ROIs identified in the image 132. The third video frame 270 is an inter-frame referencing the second video frame 250, and encodes higher-resolution version of the ROIs and uses information obtained found in the second video frame 250 to more efficiently encode the higher-resolution versions/crops of the ROIs. As mentioned earlier herein, one or both of the first video frame 230 and the third video frame 270 may also be marked as no-display frames, depending on e.g. the type of decoder that will be used to decode the encoded video stream and whether it is e.g. more desirable to view the overview, the ROIs or both.

In an optional operation S507, the method 500 may include to check whether there are more images available and ready to be encoded. If yes, as illustrated by the dashed arrow 510, the method 500 may loop-back to operation S501 and receive a new such image, and continue to generate a new set of video frames for the new image, etc. If there are no more images available for encoding, the method 500 may (as illustrated by the dashed arrow 512) e.g. stop, or repeat checking for new images (operation S507) until one or more such new images of the scene arrives.

Figure 3:
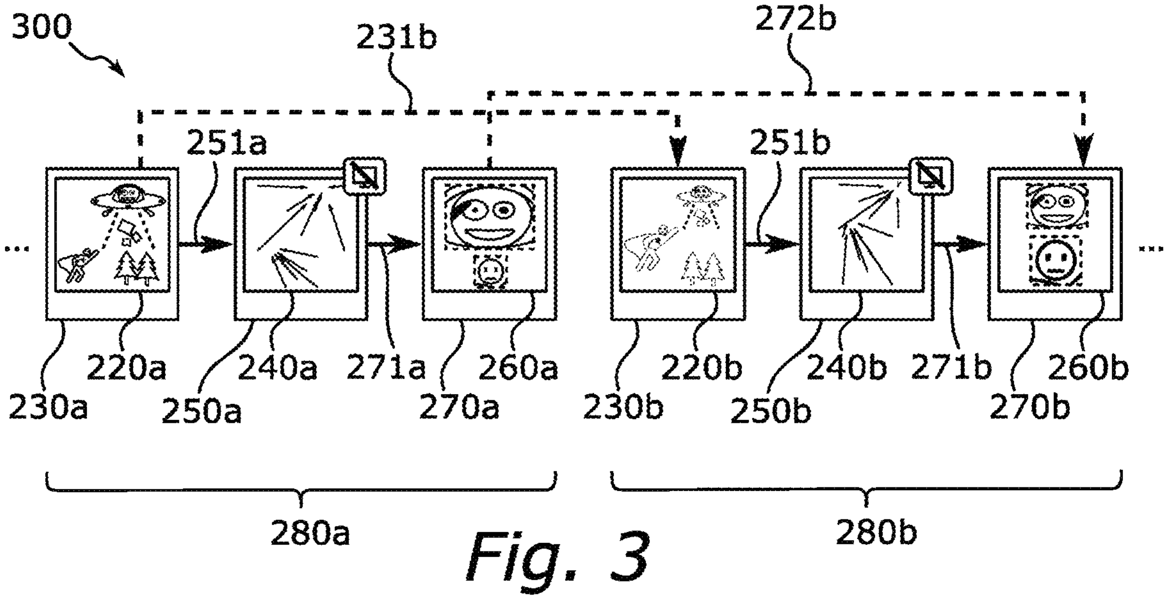
FIG. 3 schematically illustrates an example embodiment of a video stream encoded according to the present disclosure.

FIG. 3 schematically illustrates (parts of an) example video stream 300 generated by an embodiment of the method 500. In this particular example, the video stream 300 is generated using a non-layered type of coding. Here, a first image 132*a* of the scene 100 is received, and a downscaled, lower-resolution overview version 220*a* is encoded as part of a first image frame 230*a* of a first set of video frames 280*a*. A second video frame 250*a* of the first set 280*a* includes motion vectors 240*a* for upscaling of one or more ROIs identified in the first image 132*a* of the scene 100, and is an inter-frame referencing the first video frame 230*a*. The second video frame 250*a* is a no-display frame. A third video frame 270*a* of the first set 280*a* encodes (crops of) the ROIs as part of an image 260*a*, at a higher-resolution than that of the image 220 encoded by the first video frame 230*a*, and is an inter-frame referencing the second video frame 250*a*. This in order to make use of information found in the second video frame 250*a* to more efficiently encode the higher-resolution (crops of the) ROIs.

As result of receiving a second (e.g. later) image 132*b* of the scene 100 at another (e.g. later) time instance, the method 500 repeats in order to add, to a second set of video frames 280*b*, a first video frame 230*b* encoding a lower-resolution, downscaled version/overview image 220*b* of the second image 132*b*. Likewise, a second (no-display) video frame 250*b* of the second set 280*b* includes motion vectors 240*b* and references the first video frame 250*b* in order to generate upscaled versions of the ROIs identified in the second image 132*b*. Similarly, a third video frame 270*b* of the second set 280*b* references the second video frame 250*b* in order to more efficiently encode (as part of an image 260*b*) higher-resolution versions/crops of the ROIs identified in the second image 132*b*, and so on. In this example video stream 300, all images may have a same resolution (i.e. size), and the higher-resolution ROIs may be formed by the crops being scaled such that they consume a larger portion of the overall image area than in the overview image, i.e. as both the scaled ROI crops obtained by decoding the second video frames and the scaled ROI crops obtained by decoding the third video frames are wider and/or higher (in terms of pixels) than their counterparts in the overview images in the first video frames.

Optionally, to further enhance coding efficiency, the first video frame of a particular set of video frames may reference first video frames of e.g. one or more previous or one or more later set of video frames. As an example, in FIG. 3, the first video frame 230*b* of the second set 280*b* includes a reference 231*b* to the first video frame 230*a* of the first set 280*a*, in order to e.g. make use of any temporally redundant information between the two video frames 230*a* and 230*b*. Likewise, the third video frame 270*b* of the second set 280*b* includes a reference 272*b* to the third video frame 270*a* of the first set 280*a*, to also make use of any temporally redundant information between the two video frames 270*a* and 270*b*. Additional reference among the various video frames may also optionally be provided. As mentioned earlier herein, the first video frames 230*a* and 230*b* and/or the third video frames 270*a* and 270*b* may also be marked as no-display frames, or similar. For example, if the third video frames 270*a* and 270*b* are marked as no-display frames, a conventional decoder will only render visible the first video frames 230*a* and 230*b* and the corresponding lower-resolution overview of the scene, as both the second and third video frames 250*a/b* and 270 *a/b* are marked as no-display frames. If instead the first video frames 270*a* and 270*b* are marked as no-display frames, the encoder will only render the higher-resolution ROIs, as both the first and second video frames 230*a/b* and 250*a/b* are marked as no-display frames. As also described earlier herein, it is envisaged also that additional meta-data may be used to e.g. mark the frames 230*a/b* as “overview frames” and the frames 270*a/b* as “ROI frames”, or similar, such that a decoder capable of handling such additional meta data may decide which frames to render visible. In general, the envisaged method is flexible in that the data necessary to decode and render visible both the lower-resolution overview and the higher-resolution ROIs are included as part of a same encoded video stream, while exactly what (e.g. overview, ROIs or both) may be decided by adding suitable flags to the respective video frames. If so configured, a decoder may of course also decide to ignore one or more no-display flags, as long as e.g. the decoder can somehow decide which frames are overview frames, which are ROI frames, and which are e.g. including motion vectors for the scaling of the ROIs used to more efficiently encode the ROI frames.

Figure 4:
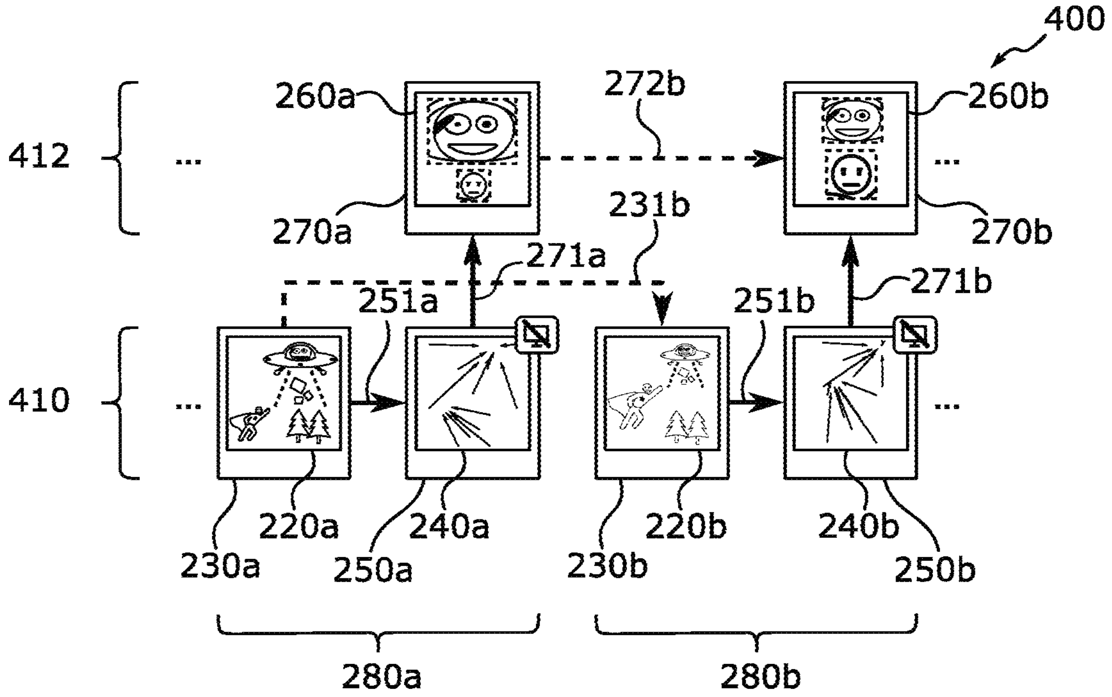
FIG. 4 schematically illustrates another example embodiment of a video stream encoded according to the present disclosure, wherein the video stream uses a layered coding.

FIG. 4 schematically illustrates (parts of an) another example video stream 400 generated by an embodiment of the method 500. In this particular example, the video stream 400 is generated using a layered type of coding, such as e.g. Scalable Video Coding (SVC) or similar. Here, the first video frames 230*a*, 230*b* and the second video frames 250*a*, 250*b* are included as part of a base layer 410 of the video stream 400, while the third video frames 270*a*, 270*b* are included as part of an enhancement layer 412 of the video stream 400. Such an embodiment may e.g. be beneficial in that video frames in the enhancement layer 412 may be allowed to encode images at a higher resolution than in the base layer 410. For example, the images 260*a*, 260*b* encoded by the third video frames 270*a*, 270*b* may e.g. have higher resolutions (i.e. contain more pixels) than the images 220*a*, 220*b* (and encoded images based on the motion vectors 240*a*, 240*b*) encoded by the first video frames 230*a*, 230*b* (and second video frames 250*a*, 250*b*). In this way, by using a layered type of coding, an area of the crops of the ROIs provided in/encoded by the third video frames 270*a*, 270*b* is not bounded by the available area of the images encoded by e.g. the first video frames 230*a*, 230*b*. Usually, it may be assumed that all layers of a layered video stream (such as 400) encodes a same scene or a same part of a scene, but at e.g. different resolutions, frame-rate, or similar, and such that each additional layer in the stack of layers provides some more information/detail than the layer below. In the present disclosure, this is however not the case, as e.g. the enhancement layer 412 and base layer 410 encodes different parts of the scene (overview and ROIs). In any way, a decoder not capable of decoding layered streams may e.g. select to ignore the enhancement layer 412 and only show the base layer 410, i.e. only the overview of the scene. A decoder capable of handling layered video streams may instead decide whether to e.g. render only the base layer 410, only the enhancement layer 412, or e.g. both layers but on different parts of a screen or on different screens. The decoder may e.g. be informed that the base layer 410 includes the overview and that the enhancement layer 412 includes the ROIs, and similar. If wanting to show only the overview, the third video frames 270*a* and 270*b* of the enhancement layer 412 may e.g. be marked as no-display frames. If wanting to show only the ROIs, the first video frames 230*a* and 230*b* in the base layer 410 may e.g. be marked as no-display frames, and similar.

Herein, it is also envisaged to provide a device, computer program and computer program product for encoding a video stream, as will now be described in more detail with reference also to FIGS. 6A, 6B and 7.

Figure 6A:
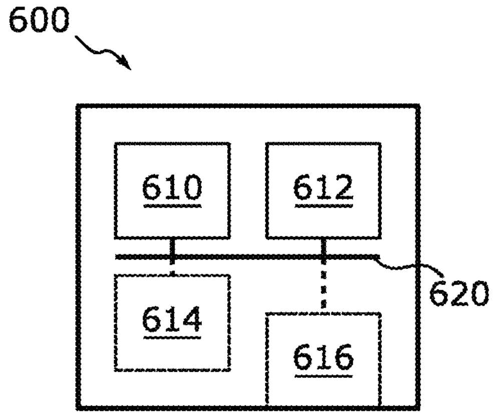
FIGS. 6A and 6B schematically illustrates various example embodiments of a device for encoding a video stream according to the present disclosure, and FIG. 7 schematically illustrates an example embodiment of a computer program, computer program product and computer-readable storage medium according to the present disclosure.

FIG. 6A schematically illustrates a device 600 for encoding a video stream as discussed earlier herein, i.e. a device configured to perform e.g. the method 500 described with reference to FIG. 5. The device 600 includes at least a processor (or "processing circuitry") 610 and a memory 612. As used herein, a "processor" or "processing circuitry" may for example be any combination of one or more of a suitable central processing unit (CPU), multiprocessor, microcontroller (μC), digital signal processor (DSP), application-specific integrated circuit (ASIC), field-programmable gate-array (FPGA), graphics processing unit (GPU), etc., capable of executing software instructions stored in the memory 612. The memory 612 may be external to the processor 610, or may be internal to the processor 610. As used herein, a "memory" may be any combination of random-access memory (RAM) and read-only memory (ROM), or any other kind of memory capable of storing the instructions. The memory 612 contains (i.e. stores) instructions that, when executed by the processor 610, cause the device 600 to perform a method as described herein (i.e. the method 500 or any embodiments thereof). The device 600 may further include one or more additional items 614 which may, in some situations, be useful for performing the method. In some example embodiments, the device 600 may for example be a (video) camera, such as a video monitoring camera, and the additional item(s) 614 may then include e.g. an image sensor and for example one or more lenses for focusing light from a scene on the image sensor, such that the monitoring camera may capture images of a scene as part of performing the envisaged method. The additional item(s) 614 may also include e.g. various other electronics components needed for capturing the scene, e.g. to properly operate the image sensor and/or lenses as desired, and to gather information pertinent to e.g. a current orientation and/or focal length of the camera and lens(es), which can be used to e.g. establish a current FOV of the camera. Performing the method in a monitoring camera may be useful in that the processing is moved to "the edge", i.e. closer to where the actual scene is captured compared to if performing the processing and video encoding somewhere else (such as at a more centralized processing server or similar). The device 600 may for example be connected to a network such that the encoded video stream resulting from performing the method may be transmitted to a user. For this purpose, the device 600 may include a network interface 616, which may be e.g. a wireless network interface (as defined in e.g. any of the IEEE 802.11 or subsequent standards, supporting e.g. Wi-Fi) or a wired network interface (as defined in e.g. any of the IEEE 802.3 or subsequent standards, supporting e.g. Ethernet). The network interface 616 may for example also support any other wireless standard capable of transferring encoded video, such as e.g. Bluetooth or similar. The various components 610, 612, 614 and 616 (if present) may be connected via one or more communication buses 620, such that these components may communicate with each other, and exchange data as required.

The device 600 may for example be a monitoring camera mounted or mountable on a building, e.g. in form of a PTZ-camera or e.g. a fisheye-camera capable of providing a wider perspective of the scene, or any other type of monitoring/surveillance camera. The device 600 may for example be a body camera, action camera, dashcam, or similar, suitable for mounting on persons, animals and/or various vehicles, or similar. The device 600 may for example be a smartphone or tablet which a user can carry and film a scene. In any such examples of the device 600, it is envisaged that the device 600 may include all necessary components (if any) other than those already explained herein, as long as the device 600 is still able to perform the method 500 or any embodiments thereof as envisaged herein.

Figure 6B:
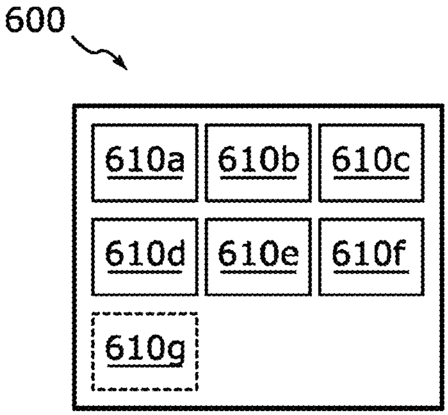

FIG. 6B schematically illustrates one or more embodiments of the device 600 in terms of a number of functional/computing blocks 610*a*-610*f*. Each such block 610*a*-610*f* is responsible for performing a functionality in accordance with a particular operation of the method 500, as shown in the flowchart of FIG. 5. For example, one such functional block 610*a* may be configured to obtain one or more images of the scene (operation S501), another block 610*b* may be configured to identify the one or more ROIs (operation S502), another block 610*c* may be configured to generate the first video frame (operation S503), another block 610*d* may be configured to generate the second video frame (operation S504), and another block 610*e* may be configured generate the third video frame (operation S505), etc. A block 610*f* may be configured to add the first, second and third video frames to the encoded video stream as part of a set of video frames (operation S506), and so on, until all operations of the method 500, or other embodiments thereof, is carried out by the device 500. The device 600 may optionally include e.g. one or more additional function blocks 610*g*, such as a block for checking whether more images of the scene are available (operation S507), and to instruct the block 610*a* to receive the new image and so on.

In general terms, each functional module 610*a*-*g* may be implemented in hardware or in software. Preferably, one or more or all functional modules 610*a*-*g* may be implemented by the processing circuitry 610, possibly in cooperation with the storage medium/memory 612 and/or the communications interface 616. The processing circuitry 610 may thus be arranged to from the memory 612 fetch instructions as provided by a functional module 610*a*-*g*, and to execute these instructions and thereby perform any operations of the method 500 performed by/in the device 600 as disclosed herein.

Generally, the device 600 may e.g. be an encoder such as the encoder 200, or at least include encoding functionality.

Figure 7:
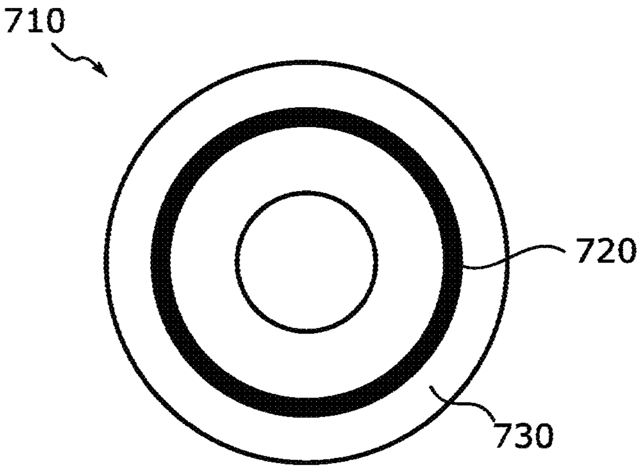

FIG. 7 schematically illustrates a computer program product 710 including a computer-readable means/storage medium 730. On the computer storage medium 730, a computer program 720 can be stored, which computer program 720 can cause the processor 610 and thereto operatively coupled entities and devices, such as the communication interface 640 and the memory 620, of the device 600 to execute method 500 according to embodiments described herein with reference to e.g. FIGS. 2A-2D, 3, 4 and 5. The computer program 720 and/or computer program product 710 may thus provide means for performing any operations of the method 500 performed by the device 600 as disclosed herein.

In the example of FIG. 7, the computer program product 710 and computer-readable storage medium 730 are illustrated as an optical disc, such as a CD (compact disc) or a DVD (digital versatile disc) or a Blu-Ray disc. The computer program product 710 and computer-readable storage medium 730 could also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 may be stored in any way which is suitable for the computer program product 710 and computer-readable storage medium 730.

In summary of the various embodiments presented herein, the present disclosure provides an improved way of encoding a video stream in order to provide both a lower-resolution overview of a scene as well as one or more higher-resolution crops of one or more ROIs of the scene, as part of a same encoded video stream. By inserting synthetic/auxiliary no-display video frames with motion vectors for upscaling (and possibly also rearranging) of the ROIs, a basis is created from which higher-resolution crops of the ROIs may more efficiently be encoded, to thereby enable provision of such lower- and higher-resolution images at lower bitrate than if e.g. providing the higher-resolution images as JPEG crops in parallel with a video stream encoding only the lower-resolution overview images. The present disclosure and the method, device, computer program and computer program product envisaged herein also eliminates potential issues with how to synchronize the higher-resolution ROI images with the lower-resolution overview image, as all video frames are inserted as part of a same encoded video stream, and synchronization thus obtained "out of the box". Another advantage is that the envisaged method is standard compliant, in the sense that an ordinary video player may still decode and play back e.g. the overview-part of the video stream even if the video stream is also provided with the higher-resolution ROIs. A more advanced decoder/video player, such as a decoder/video player specifically configured to handle the enhanced video stream as envisaged herein, may however unlock the full capability of the video stream, and render visible both the overview and the higher-resolution ROIs.

Although features and elements may be described above in particular combinations, each feature or element may be used alone without the other features and elements or in various combinations with or without other features and elements. Additionally, variations to the disclosed embodiments may be understood and effected by the skilled person in practicing the claimed invention, from a study of the drawings, the disclosure, and the appended claims.

In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

LIST OF REFERENCE NUMERALS

100 scene
120, 122 camera, FOV
130 sequence of images of scene
132, 132*a-c* images of scene
200 encoder
202, 204, 206 functional blocks of improved encoder
210,211 ROIs
212-215 higher-resolution crops of ROIs
220, 220*a-b* lower-resolution overview of scene
230, 230*a-b* first video frames
231*b* reference from first video frame
240, 240*a-b* motion vectors
242, 244 motion vectors
250, 250*a-b* second (no-display) video frames
251*a-b* reference from second video frame
260, 260*a-b* higher-resolution image of ROI crops
270, 270*a-b* third video frames
271*a-b*, 272*b* reference from third video frame
280*a-b* set of video frames
300, 400 encoded video stream
410,412 base layer, enhancement layer
500 method
S501-S507 method operations
510, 512 method flow paths
600 device
610 processor
610*a-g* functional blocks
612 memory
614, 616 optional entities, communications interface
710 computer program product
720 computer program/code
730 computer-readable storage medium

The invention claimed is:

1. A method of encoding a video stream, comprising:
obtaining one or more subsequent images of a scene captured by at least one camera, and
for each of the one or more images:
identifying one or more regions of interest (ROIs) in the image;
adding a set of video frames to an encoded video stream, the set comprising at least three separate video frames comprising:
a first video frame encoding at least part of the scene in the image at a lower resolution than a resolution of the at least part of the scene in the image, wherein the at least part of the scene includes the one or more ROIs; and
a third video frame encoding the one or more ROIs at a higher resolution than a resolution of the one or more ROIs encoded in the first video frame,
wherein, for a purpose of creating a reference video frame for encoding of the third video frame, the set of video frames further comprises:
a second video frame being an inter-frame referencing the first video frame and including motion vectors between the second video frame and the first video frame for upscaling of the one or more ROIs to a resolution higher than a resolution of the one or more ROIs in the first video frame, wherein the second video frame is marked as a no-display frame, and wherein the third video frame is an inter-frame referencing the second video frame.

2. The method according to claim 1, comprising generating the encoded video stream using a layered type of coding such as scalable video-coding, SVC, wherein, for at least one set, the first and second video frames are inserted in a base layer of the encoded video stream, and the third video frame is inserted in an enhancement layer of the encoded video stream.

3. The method according to claim 1, wherein the resolution of the one or more ROIs encoded in the third video frame of the set equals a resolution of the one or more ROIs in the image.

4. The method according to claim 1, wherein, for at least one set, the motion vectors are both for upscaling and rearranging of the one or more ROI encoded in the first video frame.

5. The method according to claim 1, wherein, for at least one set, the third video frame comprises one or more skip-blocks for parts of the third video frame not encoding the one or more ROIs.

6. The method according to claim 1, wherein, for at least one set, the first video frame is an inter-frame referencing the first video frame of a previous set.

7. The method according to claim 1, wherein, for at least one set, the third video frame further references the third video frame of a previous set.

8. The method according to claim 1, the method being performed by a same camera used to capture the one or more images of the scene.

9. A device for encoding a video stream, comprising:
a processor, and
a memory storing instructions that, when executed by the processor, cause the device to:
obtain one or more subsequent images of a scene captured by at least one camera, and
for each of the one or more images:
identify one or more regions of interest (ROIs) in the image;
add a set of video frames to an encoded video stream, the set comprising at least three separate video frames comprising:
a first video frame encoding at least part of the scene in the image at a lower resolution than a resolution of the at least part of the scene in the image, wherein the at least part of the scene includes the one or more ROIs, and a third video frame encoding the one or more ROIs at a higher resolution than a resolution of the one or more ROIs encoded in the first video frame of the set,
wherein, for a purpose of creating a reference video frame for encoding of the third video frame, the set of video frames further comprises:
a second video frame being an inter-frame referencing the first video frame and including motion vectors between the second video frame and the first video frame for upscaling of the one or more ROIs to a resolution higher than a resolution of the one or more ROIs in the first video frame, wherein the second video frame is marked as a no-display frame, and wherein the third video frame is an inter-frame referencing the second video frame.

10. The device according to claim 9, wherein the instructions are further such that they, when executed by the processor, cause the device to perform a method of encoding a video stream, comprising:
obtaining one or more subsequent images of a scene captured by at least one camera, and
for each of the one or more images:
identifying one or more regions of interest (ROIs) in the image;
adding a set of video frames to an encoded video stream, the set comprising at least three separate video frames comprising:
a first video frame encoding at least part of the scene in the image at a lower resolution than a resolution of the at least part of the scene in the image, wherein the at least part of the scene includes the one or more ROIs; and
a third video frame encoding the one or more ROIs at a higher resolution than a resolution of the one or more ROIs encoded in the first video frame,
wherein, for the purpose of creating a reference video frame for encoding of the third video frame, the set of video frames further comprises:
a second video frame being an inter-frame referencing the first video frame and including motion vectors for upscaling of the one or more ROIs to a resolution higher than a resolution of the one or more ROIs in the first video frame, wherein the second video frame is marked as a no-display frame, and wherein the third video frame is an inter-frame referencing the second video frame; and
generating the encoded video stream using a layered type of coding such as scalable video-coding, SVC, wherein, for at least one set, the first and second video frames are inserted in a base layer of the encoded video stream, and the third video frame is inserted in an enhancement layer of the encoded video stream.

11. The device according to claim 9, wherein the device is a camera for capturing the one or more images of the scene.

12. A computer program product comprising a non-transitory computer-readable storage medium storing instructions for encoding a video stream, the instructions configured to, when executed by a processor of a device, cause the device to:
obtain one or more subsequent images of a scene captured by at least one camera, and
for each of the one or more images:
identify one or more regions of interest (ROIs) in the image;
add a set of video frames to an encoded video stream, the set comprising at least three separate video frames comprising:
a first video frame encoding at least part of the scene in the image at a lower resolution than a resolution of the at least part of the scene in the image, wherein the at least part of the scene includes the identified one or more ROIs, and
a third video frame encoding the one or more ROIs of the image at a higher resolution than a resolution of the one or more ROIs encoded in the first video frame of the set,
wherein, for a purpose of creating a reference video frame for encoding of the third video frame, the set of video frames further comprises:

a second video frame being an inter-frame referencing the first video frame and including motion vectors between the second video frame and the first video frame for upscaling of the one or more ROIs to a resolution higher than a resolution of the one or more ROIs in the first video frame, wherein the second video frame is marked as a no-display frame, and wherein the third video frame is an inter-frame referencing the second video frame.

* * * * *